United States Patent
Digrigoli et al.

(10) Patent No.: US 7,742,985 B1
(45) Date of Patent: Jun. 22, 2010

(54) MULTICURRENCY EXCHANGES BETWEEN PARTICIPANTS OF A NETWORK-BASED TRANSACTION FACILITY

(75) Inventors: Giacomo Digrigoli, San Francisco, CA (US); George Lee, Mountain View, CA (US)

(73) Assignee: PayPal Inc., San Jose, CA (US)

( * ) Notice: Subject to any disclaimer, the term of this patent is extended or adjusted under 35 U.S.C. 154(b) by 1491 days.

(21) Appl. No.: 10/608,525

(22) Filed: Jun. 26, 2003

(51) Int. Cl.
*G06Q 40/00* (2006.01)

(52) U.S. Cl. .......................................... 705/39; 705/40

(58) Field of Classification Search .............. 705/10–44
See application file for complete search history.

(56) References Cited

U.S. PATENT DOCUMENTS

| | | |
|---|---|---|
| 3,652,795 A | 3/1972 | Wolf et al. |
| 4,251,867 A | 2/1981 | Uchida et al. |
| 4,766,293 A | 8/1988 | Boston |
| 4,812,628 A | 3/1989 | Boston et al. |
| 4,823,264 A | 4/1989 | Deming |
| 4,837,422 A | 6/1989 | Dethloff et al. |
| 4,877,947 A | 10/1989 | Mori |
| 4,968,873 A | 11/1990 | Dethloff et al. |
| 5,262,942 A | 11/1993 | Earle |
| 5,369,705 A | 11/1994 | Bird et al. |
| 5,418,949 A | 5/1995 | Suzuki |
| 5,440,634 A | 8/1995 | Jones et al. |
| 5,442,782 A | 8/1995 | Malatesta et al. |
| 5,453,601 A | 9/1995 | Rosen |
| 5,455,407 A | 10/1995 | Rosen |
| 5,535,276 A | 7/1996 | Ganesan |
| 5,557,518 A | 9/1996 | Rosen |
| 5,644,721 A | 7/1997 | Chung et al. |

(Continued)

FOREIGN PATENT DOCUMENTS

DE 4308597 A1 8/1993

(Continued)

OTHER PUBLICATIONS

*OED Online Main entry text Frame*, [Online]. <URL: http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>.

(Continued)

*Primary Examiner*—Frantzy Poinvil
(74) *Attorney, Agent, or Firm*—Schwegman, Lundberg & Woessner, P.A.

(57) ABSTRACT

A method and apparatus for facilitating online payment transactions in multiple currencies between participants of a network-based transaction facility are described. In one embodiment, a user interface is communicated to a sender via a communications network. The user interface facilitates sender input with respect to a desired currency in which a payment to a recipient is to be made. Further, data identifying a sender-selected currency is received from the sender via the communications network. In response, information identifying a current exchange rate for conversion between the sender-selected currency and a sender primary currency is communicated to the sender via the communications network. If the sender confirms the payment in the sender-selected currency, the recipient is informed about the payment in the sender-selected currency.

39 Claims, 15 Drawing Sheets

U.S. PATENT DOCUMENTS

| | | | |
|---|---|---|---|
| 5,659,165 | A | 8/1997 | Jennings et al. |
| 5,671,364 | A | 9/1997 | Turk |
| 5,687,323 | A | 11/1997 | Hodroff |
| 5,715,399 | A | 2/1998 | Bezos |
| 5,729,594 | A | 3/1998 | Klingman |
| 5,774,553 | A | 6/1998 | Rosen |
| 5,778,178 | A | 7/1998 | Arunachalum |
| 5,787,402 | A | 7/1998 | Potter et al. |
| 5,897,621 | A * | 4/1999 | Boesch et al. .................. 705/26 |
| 5,963,923 | A | 10/1999 | Garber |
| 5,969,974 | A | 10/1999 | Vandenbelt et al. |
| 5,971,274 | A | 10/1999 | Milchman |
| 5,987,500 | A | 11/1999 | Arunachalam |
| 5,999,913 | A | 12/1999 | Goodwin, III |
| 6,016,955 | A | 1/2000 | De Rooij et al. |
| 6,018,721 | A | 1/2000 | Aziz et al. |
| 6,095,410 | A * | 8/2000 | Andersen et al. ............ 235/380 |
| 6,122,355 | A | 9/2000 | Strohl |
| 6,205,433 | B1 | 3/2001 | Boesch et al. |
| 6,212,556 | B1 | 4/2001 | Arunachalam |
| 6,386,446 | B1 | 5/2002 | Himmel et al. |
| 6,389,427 | B1 | 5/2002 | Faulkner |
| 6,721,715 | B2 | 4/2004 | Nemzow |
| 7,206,768 | B1 | 4/2007 | deGroeve et al. |
| 2001/0011241 | A1 | 8/2001 | Nemzow |
| 2002/0029339 | A1 | 3/2002 | Rowe |
| 2002/0099656 | A1 | 7/2002 | Poh Wong |
| 2002/0111907 | A1 | 8/2002 | Ling |
| 2002/0174031 | A1 | 11/2002 | Weiss |
| 2006/0136301 | A1 | 6/2006 | Grovit |
| 2008/0147479 | A1 | 6/2008 | Johnson |

FOREIGN PATENT DOCUMENTS

| | | |
|---|---|---|
| EP | 0251619 A2 | 1/1988 |
| EP | 0254812 A2 | 2/1988 |
| EP | 0542298 A2 | 5/1993 |
| EP | 0590861 A2 | 4/1994 |
| GB | 2261579 A | 5/1993 |
| GB | 2296413 A | 6/1996 |
| GB | 2301919 A | 12/1996 |
| WO | WO-9116691 A1 | 10/1991 |
| WO | WO-9512169 A1 | 5/1995 |
| WO | WO-9633568 A1 | 10/1996 |
| WO | WO-9636024 A1 | 11/1996 |
| WO | WO-9641315 A1 | 12/1996 |
| WO | WO-9704411 A1 | 2/1997 |
| WO | WO-9743727 A1 | 11/1997 |
| WO | WO-9748078 A2 | 12/1997 |
| WO | WO 02/33618 A1 | 4/2002 |

OTHER PUBLICATIONS

"U.S. Appl. No. 09/905,525, Non-Final Office Action mailed Aug. 22, 2008", 18 pgs.

"U.S. Appl. No. 09/905,525, Final Office Action mailed Jan. 10, 2008", 15 pgs.

"U.S. Appl. No. 09/905,525, Response filed Mar. 27, 2008 to Final Office Action mailed Jan. 10, 2008", 17 pgs.

"U.S. Appl. No. 09/905,525, Response filed Jun. 10, 2008 to Final Office Action mailed Jan. 10, 2008", 20 pgs.

"U.S. Appl. No. 09/905,525, Advisory Action mailed May 2, 2008", 5 pgs.

"U.S. Appl. No. 10/407,756, Non-Final Office Action mailed Jun. 27, 2008", 10 pgs.

"U.S. Appl. No. 10/407,756 Response filed Sep. 26, 2008 to Non-Final Office Action mailed Jun. 27, 2008", 18 pgs.

"U.S. Appl. No. 10/607,587, Response filed Feb. 28, 2008 to Non-Final Office Action mailed Nov. 30, 2007", 15 pgs.

"U.S. Appl. No. 10/607,587 Response filed Jun. 19, 2008 to Final Office Action mailed Apr. 21, 2008", 17 pgs.

"U.S. Appl. No. 10/607,587, Final Office Action mailed Apr. 21, 2008", 30 Pages.

Bidnbuy, "Going, going, virtually gone . . . ", *Business and Finance Dialog File 20#06012646*, (Jun. 17, 1999), 3 pgs.

Chapman, Robert L, et al., "", *Roget's International thesaurus fourth*, Thomas Y Crowell, Publishers New York sec 637, (1997).

"U.S. Appl. No. 10/407,756, Preliminary Amendment filed Nov. 3, 2003", 12 pgs.

"U.S. Appl. No. 10/607,587, Non-Final Office Action mailed Nov. 30, 2007", 19 pgs.

"U.S. Appl. No. 10/607,587 Response filed Oct. 16, 2008 to Final Office Action mailed Apr. 21, 2008", 19 pgs.

"PSINet Teams with WorldPay Ltd. to Launch the World's First Secure Multi-Currency Solution for International Electronic Commerce", *PR Newswire Association*, (Oct. 6, 1997).

"RSA signs deal with China", *Internet Week*, 2(7), (Feb. 12, 1996).

Bers, Joanna Smith, "Cyberspace: The new promised land", *Bank Systems & Technology*, 32(7), (Jul. 1995), 32-37.

Cohen, Jackie, "Citibank's Bid to Be the King of Cash (Citibank unveils Electronic Monetary System prototype, a digital currency system capable of replacing all current monetary systems)", *Bank Technology News*, 9(9), (Sep. 1996), p. 9+.

Lee, Pui-Mun, et al., "Considering exchange rate movements in economic evaluation of foreign direct investments", *Engineering Economist*, 40(2), (Winter, 1995), 171-199.

McDougall, Bruce, "Electronic evolution", *Canadian Banker*, 102(5), (Sep.-Oct. 1995), p. 28(6).

U.S. Appl. No. 09/905,525 Non-Final Office Action mailed Mar. 5, 2009, 25 pgs.

U.S. Appl. No. 09/905,525 Response filed Nov. 24, 2008 to Non-Final Office Action mailed Aug. 22, 2008, 17 pgs.

U.S. Appl. No. 10/407,756 Final Office Action mailed Jan. 7, 2009, 28 pgs.

U.S. Appl. No. 10/607,587 Non-Final Office Action mailed Dec. 19, 2008, 31 pgs.

European Application Serial No. 01959319.3 Office Action mailed May 15, 2007, 3 pgs.

Lassila, Ora, "Web metadata; a mater or semantics", *IEEE Internet Computing*, v2i4pg30 Proquest #1424143061, (1998), 15 pgs.

\* cited by examiner

MULTICURRENCY EXCHANGES BETWEEN PARTICIPANTS OF A NETWORK-BASED TRANSACTION FACILITY

FIELD OF THE INVENTION

The present invention relates generally to the field of e-commerce and, more specifically, to facilitating online payment transactions in multiple currencies between participants of a network-based transaction facility.

BACKGROUND OF THE INVENTION

Typically, an electronic payment system allows participants of a network-based transaction facility to collect payments online. For example, the payer may send money to the electronic payment system using a credit card or check, or funds in a payer account maintained by the electronic payment system. Recipients can store money in their accounts maintained by the electronic payment system, transfer the money to a separate bank account or have the electronic payment system cut them a check.

With the growth in international commerce, problems arise due to different monetary systems used in different countries. That is, money is generally expressed in different currencies in different countries and the value of the different currencies vary greatly.

Currency conversion is widely used to convert money from one currency into money of a different currency. However, currency conversion represents a significant economic risk to both buyers and sellers in international commerce. For example, when a buyer in the U.S. desires to buy a product in an on-line transaction facility from a seller in France, the buyer may use a credit card to pay the seller for the product. The credit card company may pay the seller in Euros, and then at an undetermined later date, it will bill an amount to the buyer in U.S. dollars. The amount billed to the buyer is determined by an exchange rate used at the time the credit card company settles the transaction. The time of this settlement is at the credit card company's discretion. The risk to the credit card company is minimal because the credit card company can settle the transaction when exchange rates are favorable. Thus, in this case, it is the buyer who bears the risk that the value of the buyer's currency will decline prior to this settlement.

In another example, a seller participating in an online transaction facility may decide to accept a different currency to be able to sell the product. In this case, the seller may later sell the currency to a currency trader, usually at a discount. The price the seller charges to the buyer who pays cash reflects both the cost of currency conversion and the risk that the rate used to establish the price of the product in a particular currency may have changed. This typically results in the buyer paying a higher price for the product and the seller incurring risk due to a possible change in currency exchange rates.

In yet another example, a buyer may convert from the native currency to a different second currency before the sale to be able to buy a product from a seller who only accepts payments in the second currency. In this case, the buyer can purchase goods at a price in the second currency, but cannot be certain of the value of the second currency relative to the buyer's native currency. Thus, the individual assumes the risk of devaluation of the second currency against the first currency. Further, the buyer bears the risk that the second currency may cease to be convertible into his native currency.

The above problems create inconvenience and uncertainty for participants in international commerce, thus discouraging the development of international commerce over electronic networks.

SUMMARY OF THE INVENTION

A method and apparatus for facilitating online payment transactions in multiple currencies between participants of a network-based transaction facility are described. In one embodiment, a user interface is communicated to a sender via a communications network. The user interface facilitates sender input with respect to a desired currency in which a payment to a recipient is to be made. Further, data identifying a sender-selected currency is received from the sender via the communications network. In response, information identifying a current exchange rate for conversion between the sender-selected currency and a sender primary currency is communicated to the sender via the communications network. If the sender confirms the payment in the sender-selected currency, the recipient is informed about the payment in the sender-selected currency.

BRIEF DESCRIPTION OF THE DRAWINGS

The present invention is illustrated by way of example and not limitation in the figures of the accompanying drawings, in which like references indicate similar elements and in which:

FIGS. 11-20 are exemplary representations of various interfaces included in the sequence of interfaces shown in FIG. 8.

DETAILED DESCRIPTION

A method and apparatus for facilitating online payment transactions in multiple currencies between users over a communications network are described. In the following description, for purposes of explanation, numerous specific details are set forth in order to provide a thorough understanding of the present invention. It will be evident, however, to one skilled in the art that the present invention may be practiced without these specific details.

System for Processing Online Payment Transactions

Figure 1:
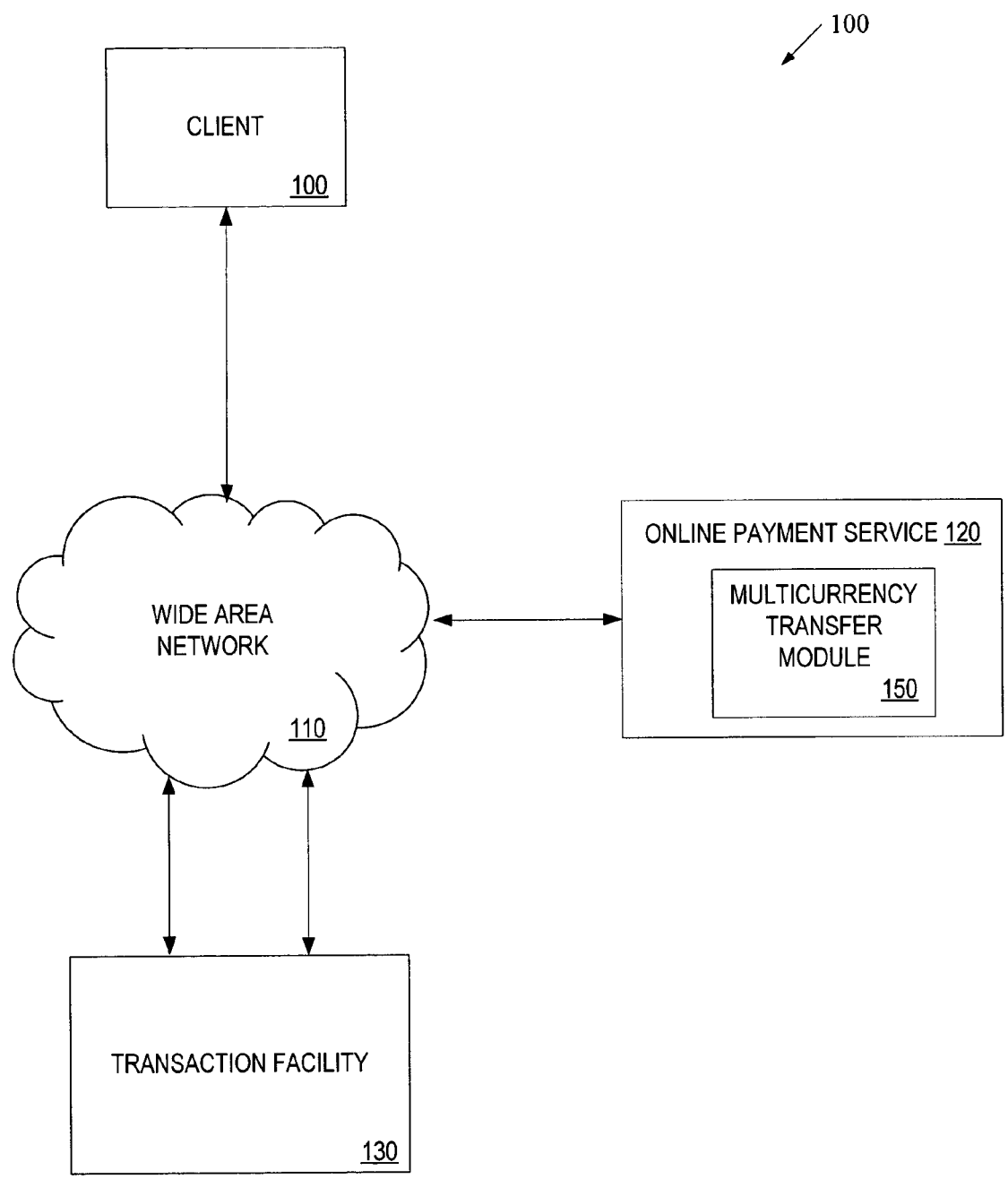
FIG. 1 is a block diagram of one embodiment of a system for processing online multicurrency payment transactions between participants in a network-based transaction facility.

FIG. 1 is a block diagram of one embodiment of a system for processing online payment transactions in multiple currencies between participants in a network-based transaction facility. In this embodiment, a client 100 is coupled to a transaction facility 130 via a communications network, including a wide area network 110 such as, for example, the Internet. Other examples of networks that the client may utilize to access the transaction facility 130 include a local area network (LAN), a wireless network (e.g., a cellular network), or the Plain Old Telephone Service (POTS) network.

The client 100 represents a device that allows a user to participate in a transaction facility 130. The transaction facility 130 handles all transactions between various participants including the user of the client computer 100. In one embodiment, the transaction facility 130 may be an online auction facility represented by an auction web site visited by various participants including the user of the client computer 100. Alternatively, the transaction facility 130 may be an online retailer or wholesaler facility represented by a retailer or wholesaler web site visited by various buyers including the user of the client computer 100. In yet other embodiments, the transactions facility 130 may be any other online environment used by a participant to conduct business transactions.

The transaction facility 130 is coupled to an online payment service 120. In one embodiment, the transaction facility 130 is coupled to the online payment service 120 via a communications network such as, for example, an internal network, the wide area network 110, a wireless network (e.g., a cellular network), or the Plain Old Telephone Service (POTS) network. Alternatively, the online payment service 120 is integrated with the transaction facility 130 and it is a part of the transaction facility 130. The online payment service 120 is also coupled to the client 100 via any of the described above communications networks. The online payment service 120 is a service for enabling online payment transactions between participants of the transaction facility 130, including the user of the client computer 100.

In one embodiment, the online payment service 120 includes a multi-currency transfer module 150 that allows the participants to maintain account balances in different currencies and make online payments in different currencies in the course of business conducted in the transaction facility 130. The term "currency" as referred to herein may include, for example, denominations of script and coin that are issued by government authorities as a medium of exchange. In another example, a "currency" may also include a privately issued token that can be exchanged for another privately issued token or government script. For example, a company might create tokens in various denominations. This company issued "money" could be used by employees to purchase goods from sellers. In this case, an exchange rate might be provided to convert the company currency into currencies which are acceptable to merchants.

As will be discussed in more detail below, in one embodiment, the multicurrency transfer module 150 allows the participants to make educated decisions as to which currency to choose for sending and receiving payments. In another embodiment, the multicurrency module 150 provides the participants with a mechanism for managing their account balances in different currencies.

Figure 2:
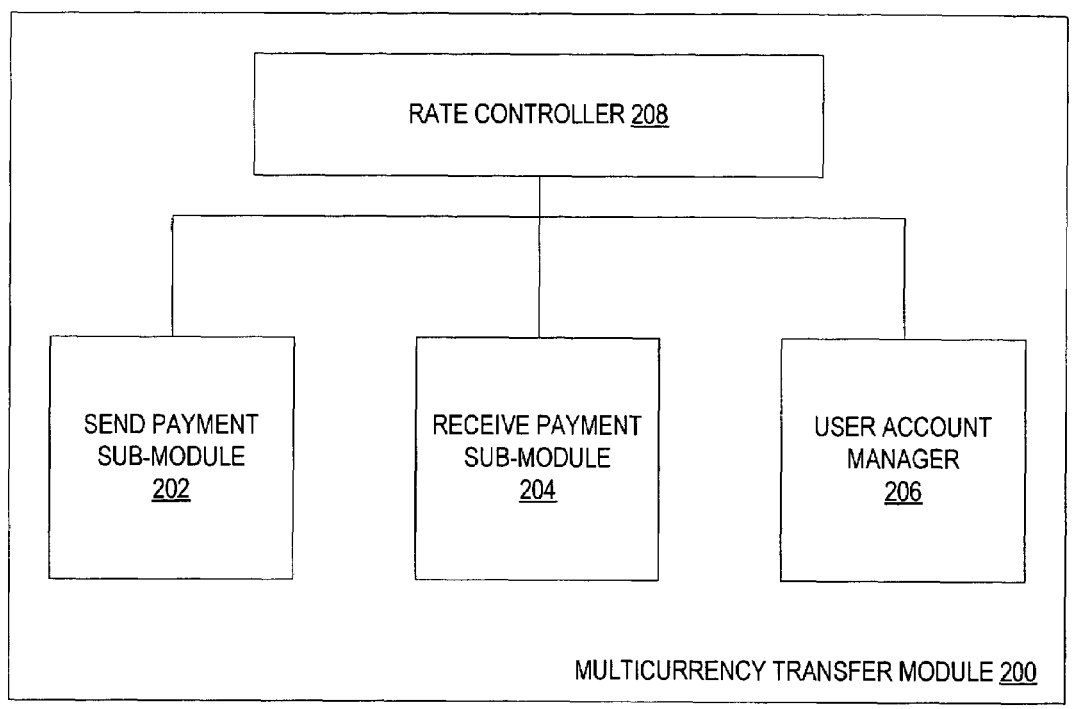
FIG. 2 is a block diagram of one embodiment of a multicurrency transfer module.

FIG. 2 is a block diagram of one embodiment of a multicurrency transfer module 200. The multicurrency transfer module 200 includes, in one embodiment, a send payment sub-module 202, a receive payment sub-module 204, a user account manager 206, and a rate controller 208.

In one embodiment, the send payment sub-module 202 is responsible for facilitating a sender selection of a currency in which a payment to a recipient is to be made, for funding the payment, for notifying a recipient about the payment, and for handling returned or denied payments. In one embodiment, if the sender does not hold an account balance in the currency that he or she selects for the payment, the send payment sub-module 202 is responsible for automatically converting funds from an existing sender balance in a different currency into the selected currency.

In one embodiment, the receive payment sub-module 204 is responsible for assisting a recipient in making a decision with respect to an acceptance of a sender payment in a specific currency, for converting the sender payment into a different currency if needed, and for notifying the sender about the recipient's decision.

In one embodiment, the user account manager 206 is responsible for allowing users to hold account balances in different currencies, for opening/removing currency balances within user accounts, and for performing transfers of funds between different currency balances within a user account.

In one embodiment, the rate controller 208 is responsible for periodically obtaining exchange rates from a third party system and using these rates to refresh rates stored in a database of the online payments service.

In one embodiment, the multicurrency transfer module 200 also includes a withdraw funds sub-module that allows users to withdraw money from any currency balance to a user bank account. If the withdrawal requires conversion, the relevant conversion data is presented to the user and the user is requested to confirm the final withdrawal.

Figure 3:
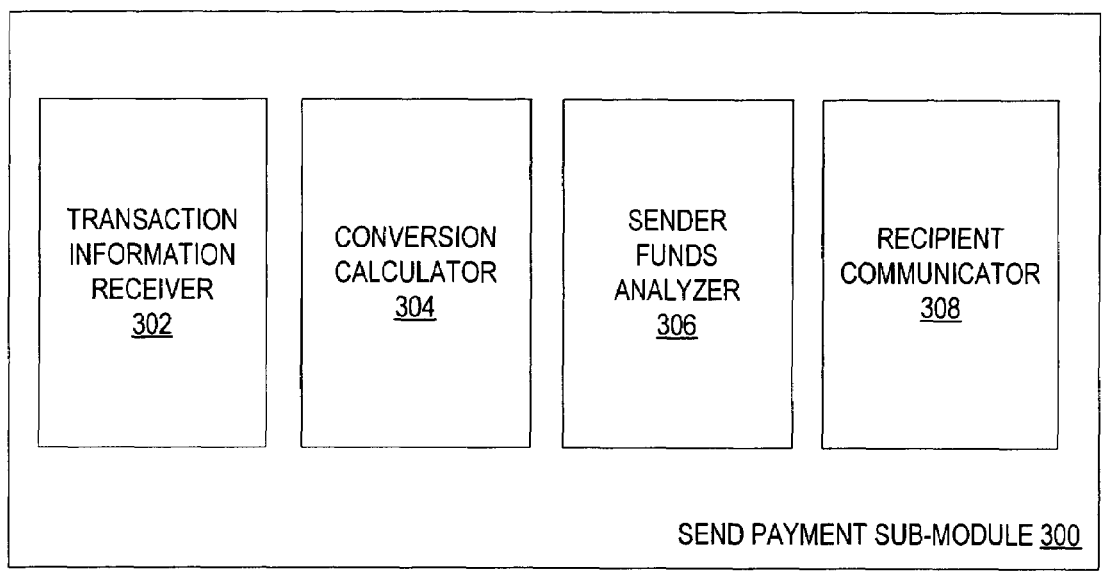
FIG. 3 is a block diagram of one embodiment of a send payment sub-module.

FIG. 3 is a block diagram of one embodiment of a send payment sub-module 300. The send payment sub-module 300 includes, in one embodiment, a transaction information receiver 302, a conversion calculator 304, a sender funds analyzer 306, and a recipient communicator 308.

The transaction information receiver 302 is responsible for communicating to a sender a user interface that facilitates user input of transaction information such as a recipient identifier (e.g., a recipient email address), a payment amount, a currency to be used for the payment, etc. In one embodiment, the user interface presents to the sender a list of currencies supported by the online payment system (e.g., U.S. dollars, Canadian dollars, Euros, pounds sterling, yen, etc.) and the sender is asked to select a specific currency from the list. The transaction information receiver 302 is further responsible for receiving transaction information entered by the sender via the user interface.

In one embodiment, if the currency selected by the sender for the payment is not a sender primary currency, the conversion calculator 304 is invoked. In another embodiment, the conversion calculator 304 is invoked only if the sender does not hold an account balance in the selected currency. Once invoked, the conversion calculator 304 is responsible for providing a current exchange rate between the sender-selected currency and the sender primary currency and for calculating an equivalent value in the sender primary currency for the payment amount. The primary currency may be, for example, a currency used in the majority of payment transactions that involved the sender. In another example, the primary currency is a currency that was specifically identified by the sender as primary. In yet another example, the primary currency may be a currency of a country in which the sender resides or a default currency provided by the online payment service 120.

The transaction information receiver 302 displays to the sender the conversion information provided by the conversion calculator 304 and requests the sender to confirm the payment in the selected currency. Once the sender sees the conversion information, the sender may decide that the current exchange rate for the selected currency is not favorable and select another currency. Alternatively, the sender may consider the current exchange rate as favorable and confirm the payment in the selected currency. In one embodiment, the sender may request, prior to confirming the payment, to view the history of currency conversion calculations from the sender's previous payment transactions to decide whether the current exchange rate is favorable.

The recipient communicator 308 is responsible for informing the recipient about the sender's payment in the selected currency, receiving data indicating whether the recipient decides to accept the payment in this currency, and communicating the recipient's decision to the sender. In one embodiment, if the recipient decides to deny the payment, the recipient communicator 308 displays to the sender a message offering to select a different currency.

The sender funds analyzer 306 is responsible for analyzing the sender's funds and determining how to fund the payment in the sender-selected currency. In one embodiment, if the sender holds an account balance in the selected currency, the sender funds analyzer 306 uses this account balance to fund the payment. Alternatively, if the sender does not hold an account balance in the selected currency, the sender funds analyzer 306 may use an account balance in the sender's primary currency to fund the payment. If the funds in the sender's primary balance are not enough to cover the payment, the sender funds analyzer 306 may ask the sender to specify an additional source for funding. This additional source may be, for example, a sender credit card, a sender band account, a sender balance other than the primary balance, etc. In one embodiment, the sender is presented with relevant conversion information before requesting the sender's confirmation of any conversion that is necessary to fund the payment.

Figure 4:
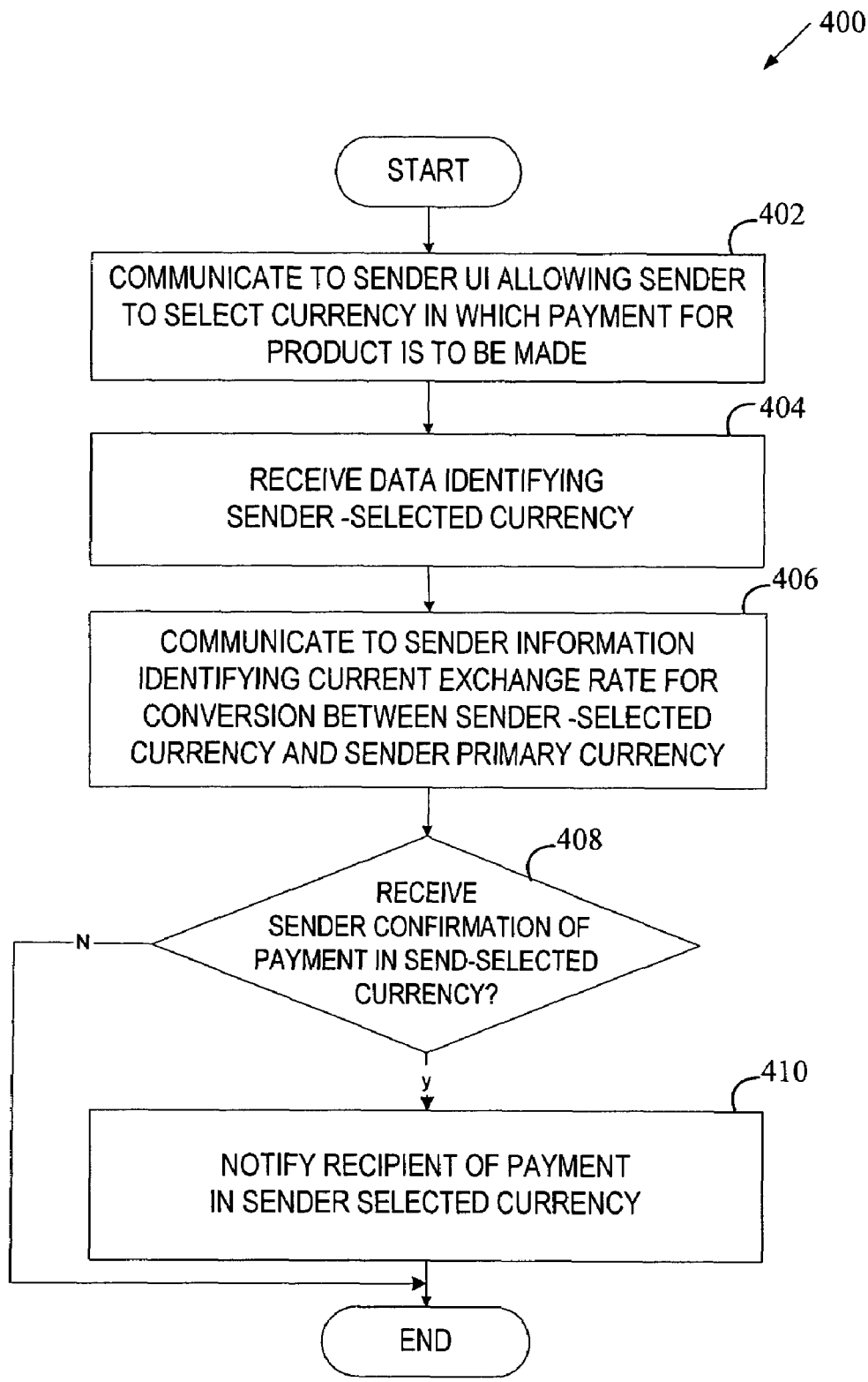
FIG. 4 is a flow diagram of one embodiment of a method for processing submissions of online multicurrency payments.

FIG. 4 is a flow diagram of one embodiment of a method 400 for processing submissions of online multicurrency payments. The method 400 may be performed by processing logic, which may comprise hardware, software, or a combination of both. Processing logic may reside either in the online payment service 120, or partially or entirely in a separate device and/or system(s).

Referring to FIG. 4, the method 400 begins with processing logic communicating to a sender via a communications network a user interface that facilitates the sender input with respect to a desired currency in which a payment is to be made (processing block 402). In one embodiment, the user interface presents to the sender, for his or her selection, a list of currencies that are supported by the online payment service 120.

At processing block 404, processing logic receives data identifying the sender-selected currency from the sender via the communications network. In response, in one embodiment, processing logic determines whether the sender-selected currency is the sender's primary currency. If it is not, processing logic determines the current exchange rate for conversion between the sender-selected currency and the sender primary currency. In another embodiment, processing logic determines the current exchange rate only if the sender does not hold an account in the sender-selected currency.

Next, processing logic communicates to the sender via the communications network the current exchange rate for the conversion between the sender-selected currency and the sender primary currency (processing block 406). In one embodiment, processing logic also presents to the sender an equivalent value in the sender primary currency for the payment amount in the sender-selected currency. The presentation of the current conversion information (e.g., the exchange rate and the equivalent value) assist the sender in determining whether the terms for converting into the sender-selected currency are favorable at the present time. In addition, in one embodiment, the sender is provided with an opportunity to view the history of currency conversion calculations from previous transactions involving the sender to compare the current terms with prior terms.

Further, if processing logic receives from the sender a confirmation of the payment in the sender-selected currency (decision box 408), processing logic notifies the recipient about the payment in the sender selected currency (processing block 410).

Figure 5:
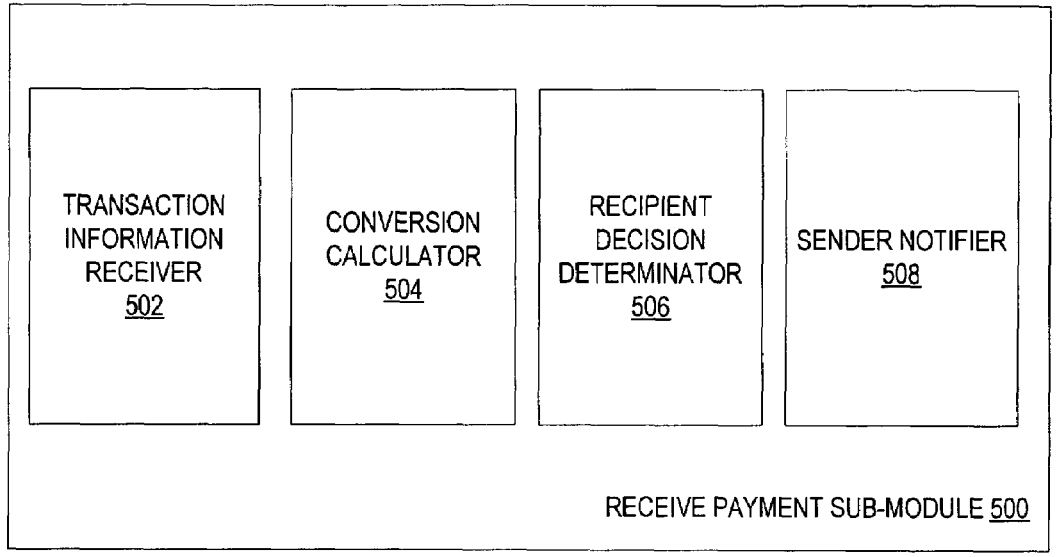
FIG. 5 is a block diagram of one embodiment of a receive payment sub-module.

FIG. 5 is a block diagram of one embodiment of a receive payment sub-module 500. The receive payment sub-module 500 includes, in one embodiment, a transaction information receiver 502, a conversion calculator 504, a recipient decision determinator 506, and a sender notifier 508.

The transaction information receiver 302 is responsible for receiving information about a sender's payment and communicating it to the recipient. The information about the sender payment may include, for example, the identifier of the sender (e.g., sender's name or email address), the payment amount, the sender-selected currency of the payment, etc.

In one embodiment, the transaction information receiver 502 is also responsible for determining whether the recipient holds an account balance in the sender-selected currency. If so, the transaction information receiver 502 is responsible for requesting a transfer of the payment amount to this account balance. If the recipient does not hold an account balance in the sender-selected currency, the conversion calculator 504 is invoked to provide a current exchange rate between the sender-selected currency and the recipient primary currency, and then the recipient decision determinator 506 communicates the current exchange rate to the recipient and requests the recipient's input with respect to an acceptance of the payment in the sender-selected currency. If the recipient accepts the payment in the sender-selected currency, the recipient decision determinator 506 requests to open a balance in the sender-selected currency within the recipient account. Alternatively, if the recipient accepts the payment in the sender-selected currency but also asks to convert it into the primary currency, the recipient decision determinator 506 performs the conversion and requests the addition of the resulting amount to the recipient's primary account balance.

In another embodiment, the recipient decision determinator 506 is responsible for requesting the recipient's input for every payment received from any sender. If the recipient specifies that he accepts the payment and wants to convert it into a different currency, the recipient decision determinator 506 is responsible for invoking the conversion calculator 504, communicating information provided by the conversion calculator 504 to the recipient, and obtaining the recipient's final confirmation of the acceptance of the payment.

In one embodiment, the conversion calculator 504 also calculates an equivalent value in a recipient primary currency (or some other currency specified by the recipient) for the payment amount in the sender-selected currency. The equivalent value is also presented to the recipient. Hence, the recipient is provided with information that can assist him in determining whether the acceptance of the payment in the sender-selected currency and/or conversion of the sender-selected currency into a different currency would be beneficial for the recipient at the present time. In addition, in one embodiment, the recipient is provided with an opportunity to view the history of currency conversion calculations from previous transactions involving the recipient to compare the current terms with prior terms.

Once the recipient specifies his decision, the sender notifier 506 notifies the sender about the recipient's decision.

Figure 6:
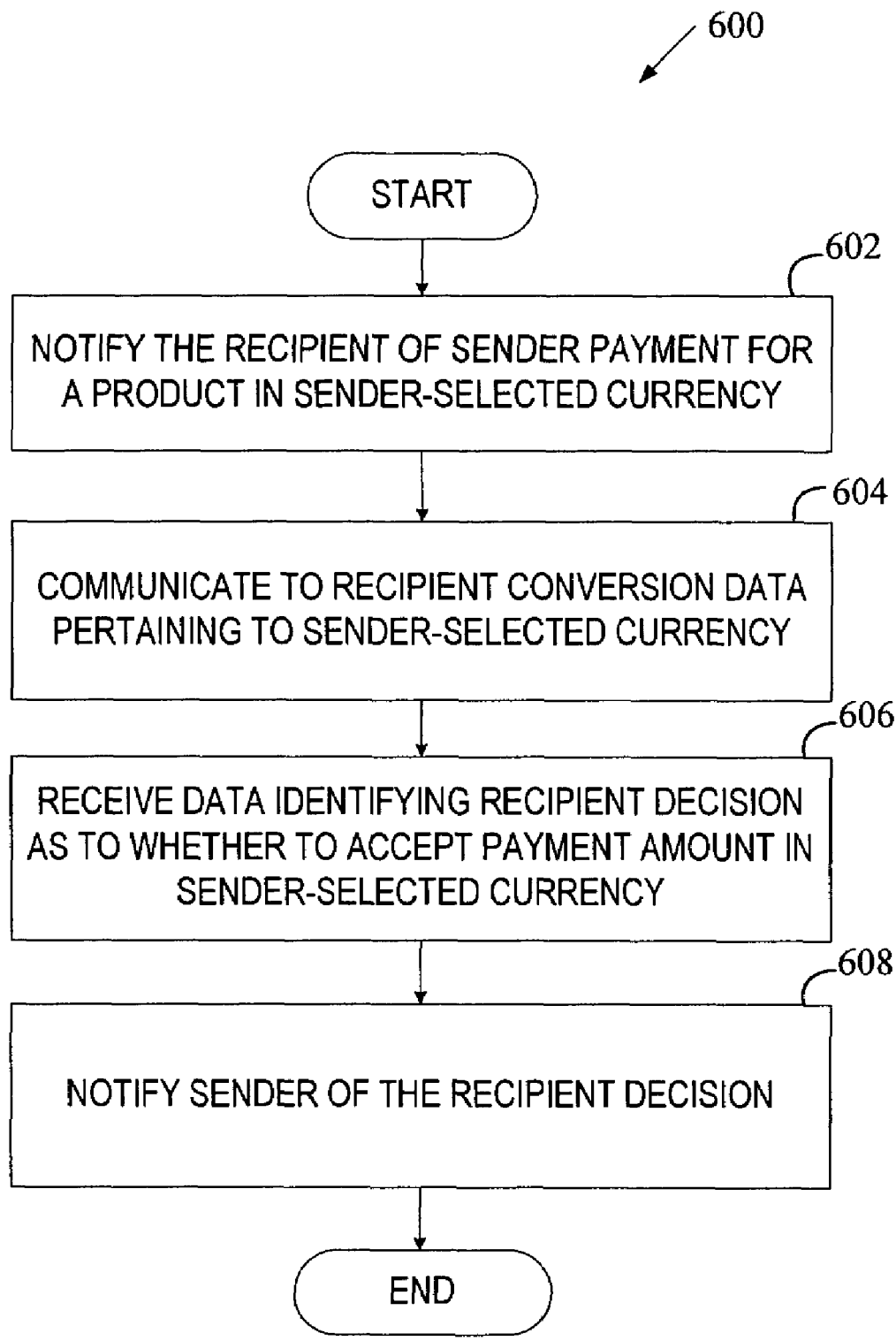
FIG. 6 is a flow diagram of one embodiment of a method for processing receipts of online multicurrency payments.

FIG. 6 is a flow diagram of one embodiment of a method 600 for processing receipts of online multicurrency payments. The method 600 may be performed by processing logic, which may comprise hardware, software, or a combination of both. Processing logic may reside either in the online payment service 120, or partially or entirely in a separate device and/or system(s).

Referring to FIG. 6, the method 600 begins with processing logic communicating to a recipient via a communications network a notification of a sender payment in a sender-selected currency (processing block 602). At processing block 604, processing logic presents to the recipient via the communications network conversion data pertaining to a payment amount in the sender-selected currency. The conversion data may include an equivalent value in a recipient primary currency for the payment amount in the sender-selected currency. In one embodiment, the conversion data is communicated to the recipient if the recipient does not hold an account balance in the sender-selected currency. Alternatively, the conversion data is communicated to the recipient for every received payment.

In one embodiment, the notification about the sender payment and the conversion data is presented to the sender using a single user interface. In one embodiment, this user interface also allows the recipient to provide input for the recipient's decision with respect to an acceptance of the sender payment.

The presentation of the conversion data assists the recipient in determining which actions with respect to the payment in the sender-selected currency would be the most advantageous for the recipient at the present time. In one embodiment, the recipient may be also presented with a history of currency conversion calculations from previous transactions involving the recipient for comparison.

At processing block 606, processing logic receives from the recipient via the communications network data indicating the recipient's decision with respect to an acceptance of the payment in the sender-selected currency. In one embodiment, in which the recipient does not hold an account balance in the sender-selected currency, the recipient is provided with three decision options: (1) accept the payment and create a balance in the sender-selected currency within the recipient account, (2) accept the payment and convert it into the recipient's primary balance, and (3) deny the payment. If the recipient chooses the first option, processing logic requests a creation of a new balance within the recipient account and a transfer of the payment amount to this new balance. If the recipient chooses the second option, processing logic converts the payment amount into the recipient's primary balance and requests a transfer of the resulting amount to the recipient's primary balance.

In one embodiment, processing logic determines the recipient decision with respect to this payment based on payment receiving preferences previously provided by the recipient with respect to future payments in currencies for which the recipient does not hold a balance.

In one embodiment, processing logic assesses a receiving fee in the sender-selected currency if the recipient accepts the payment.

Afterwards, processing logic notifies the sender via the communications network of the recipient decision (processing block 608). In one embodiment, if the recipient denies the payment, processing logic presents to the sender a message offering the sender to select a different currency for the payment.

Figure 7:
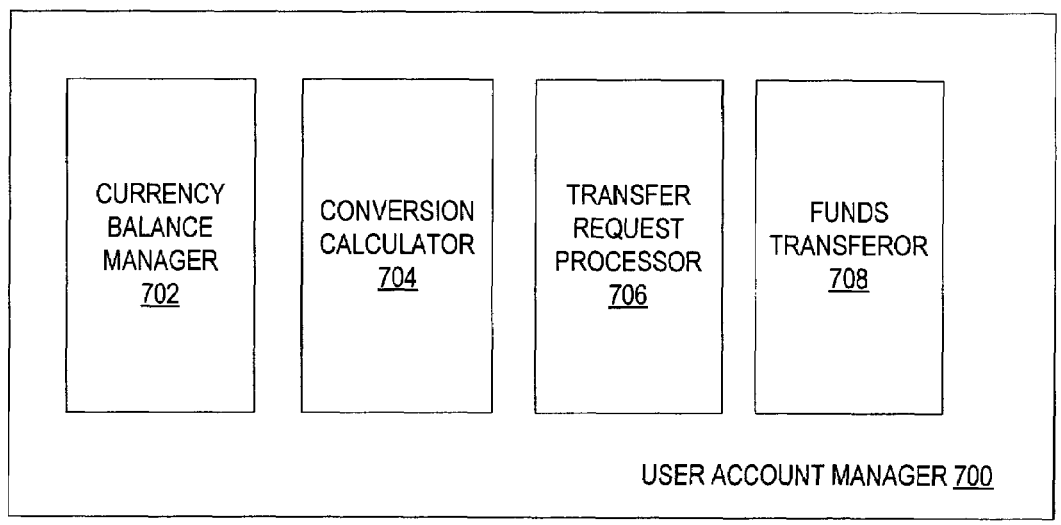
FIG. 7 is a block diagram of one embodiment of a user account manager.

FIG. 7 is a block diagram of one embodiment of a user account manager 700. The user account manager 700 includes, in one embodiment, a currency balance manager 702, a conversion calculator 704, a transfer request processor 706, and a funds transferor 708.

The currency balance manager 702 is responsible for maintaining balances in different currencies within a user account, opening new balances when needed and closing existing balances when requested by a user.

The conversion calculator 704 is responsible for providing current exchange rates and calculating amounts of potential and actual transfers.

The transfer request processor 706 is responsible for transferring funds between different currency balances within a user account. Prior to performing a transfer, the transfer request processor 706 displays conversion data provided by the conversion calculator 704 and then requests the user to confirm the transfer.

The funds transferor 708 is responsible for performing the transfer.

Figure 8:
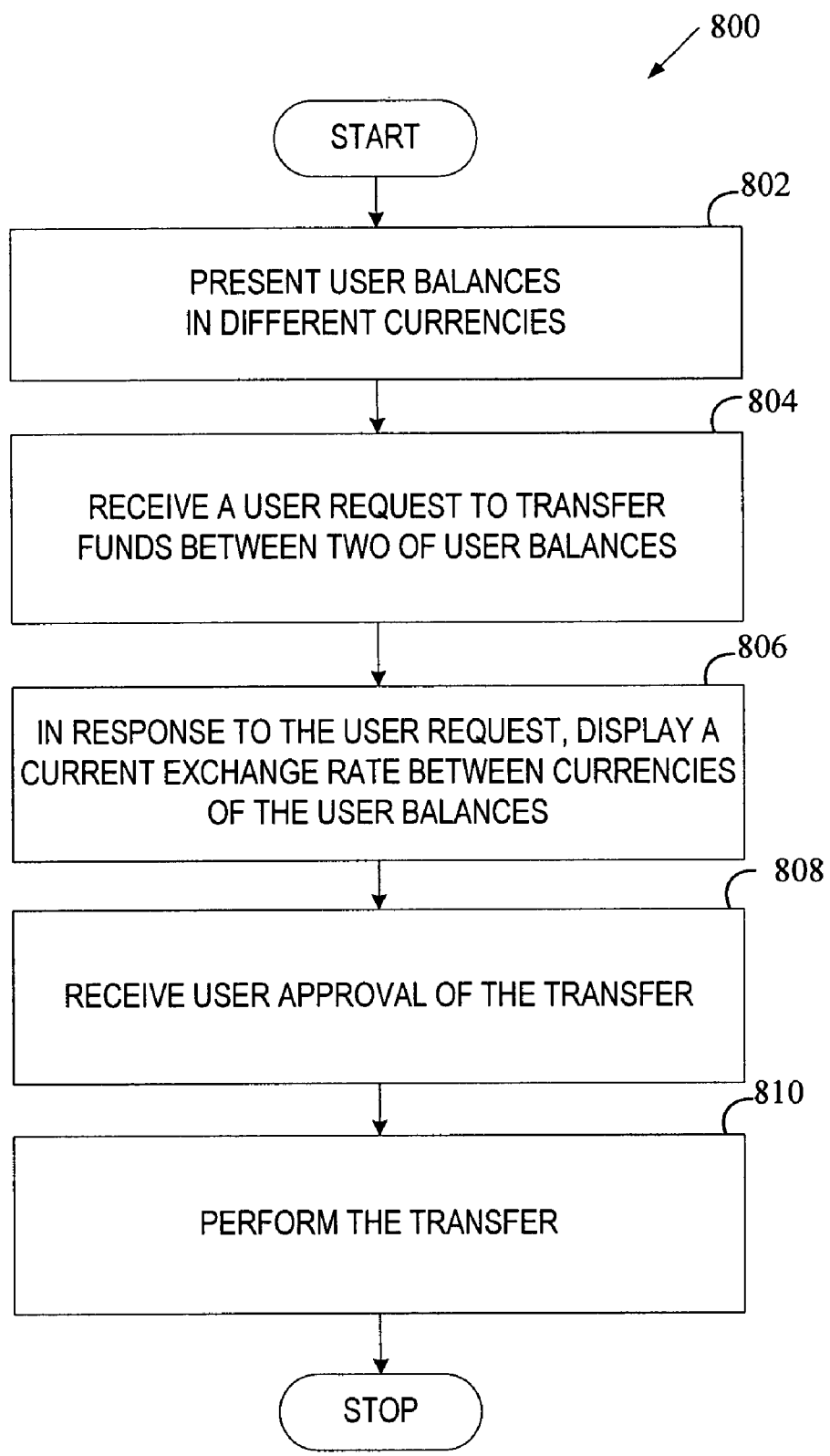
FIG. 8 is a flow diagram of one embodiment of a method for managing multicurrency balances of a user.

FIG. 8 is a flow diagram of one embodiment of a method 800 for managing multicurrency balances of a user. The method 800 may be performed by processing logic, which may comprise hardware, software, or a combination of both. Processing logic may reside either in the online payment service 120, or partially or entirely in a separate device and/or system(s).

Referring to FIG. 8, the method 800 begins with processing logic communicating to a recipient via a communications network information identifying a set of balances in different currencies within the user account (processing block 802). In one embodiment, the user is also presented with the combined total of all the balances in the user primary currency.

At processing block 804, processing logic receives from the user via the communications network data indicating a user desire to transfer funds between two currency balances. In response, processing logic presents to the user via the communications network data identifying a current exchange rate for conversion between currencies of the two balances (processing block 806).

Next, processing logic receives a user approval of the desired transfer (processing block 808) and performs the transfer (processing block 810).

As discussed above, a current exchange rate is periodically updated based on the rates obtained from a third party system. A third party may be a financial institution or any other organization that guarantees an exchange rate to the online payment service 120 during a predefined time interval. As a result, the online payment service 120 is not affected by any market fluctuations that may occur during this time interval and can provide its users with more up-to-date exchange rates.

Figure 9:
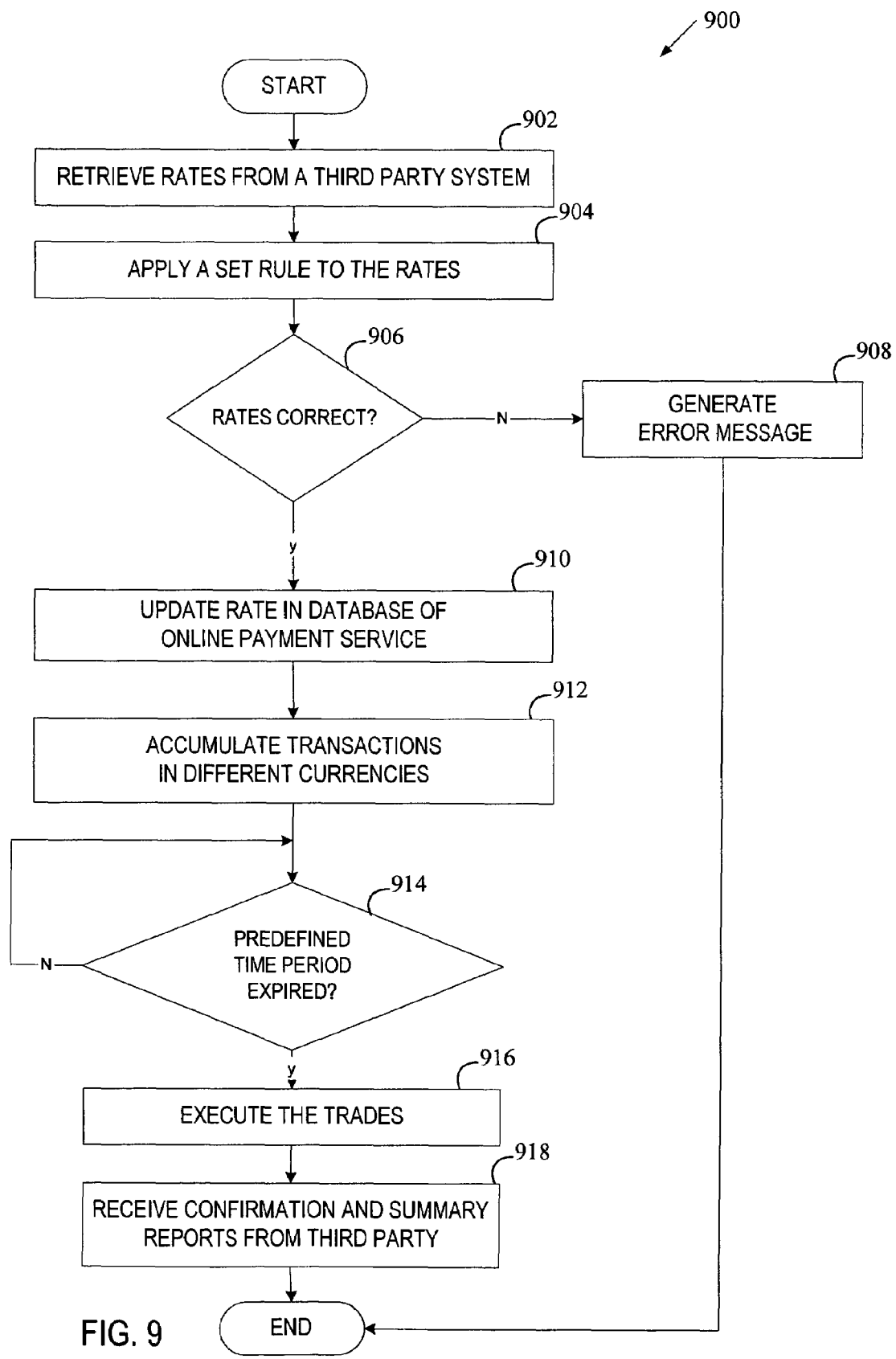
FIG. 9 is a flow diagram of one embodiment of a method for obtaining guaranteed exchange rates.

FIG. 9 is a flow diagram of one embodiment of a method 900 for obtaining guaranteed exchange rates. The method 900 may be performed by processing logic, which may comprise hardware, software, or a combination of both. Processing logic may reside either in the online payment service 120, or partially or entirely in a separate device and/or system(s).

Referring to FIG. 9, the method 900 begins with processing logic retrieving new exchange rates from a third party system (processing block 902). The new exchange rates have associated expiration dates and the online payment system is guaranteed the ability to trade against these rates within the specified window. In one embodiment, the new exchange rates are pulled via a client interface that interacts with a third party server. In one embodiment, the new exchange rates include a market exchange rate, a bid exchange rate and an ask exchange rate.

Next, processing logic applies a set of business rules to the new exchange rates (processing block 904). The set of business rules include a variety of checks (e.g., whether the new exchange rates have changed by more than 5% from the previous exchange rates) that are done to ensure that the rates are correct.

At decision box 906, processing logic determines whether the rates are correct. If not, processing logic generates an error message (processing block 908). If so, processing logic updates exchange rates currently stored in the live database of the online payment service with the new exchange rates (processing logic 910) and begins accumulating customer payment transactions in different currencies (processing block 912). When a predefined time period expires (decision box 914), processing logic requests the third party system to trade and settle the accumulated customer payment transactions (processing logic 916) and receives confirmation and summary reports once the trades are completed. In one embodiment, all transactions are funded and settled in a specific currency (e.g., U.S. dollars). In one embodiment, the trades are completed via a client interface that interacts with the third party server.

Figure 10:
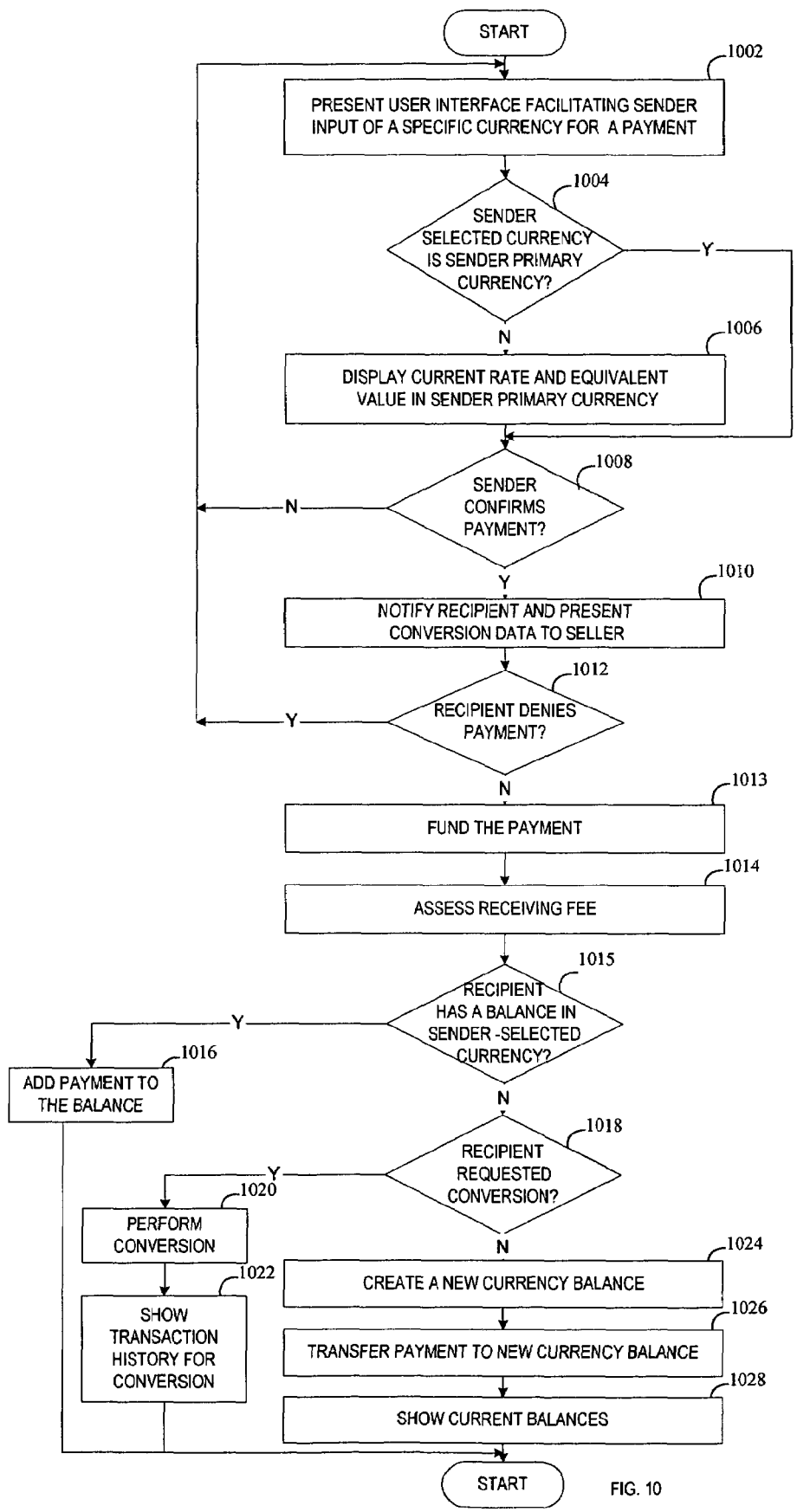
FIG. 10 is a flow diagram of one embodiment of a method for facilitating multicurrency payment transactions between participants of a network-based transaction facility.

FIG. 10 is a flow diagram of one embodiment of a method 1000 for facilitating multicurrency payment transactions between participants of a network-based transaction facility. The method 900 may be performed by processing logic, which may comprise hardware, software, or a combination of both. Processing logic may reside either in the online payment service 120, or partially or entirely in a separate device and/or system(s).

Referring to FIG. 10, the method 1000 begins with processing logic presenting to a sender a user interface that facilitates sender input of a specific currency for a payment (processing block 1002). Next, processing logic determines whether the sender-selected currency is a sender primary currency (decision box 1004). If so, the method 1000 proceeds directly to decision box 1008. If not, processing logic displays a current exchange rate for conversion between the sender-selected currency and the sender primary currency and an equivalent value in the sender primary currency (processing block 1006) and requests the sender to confirm the payment.

If the sender confirms the payment (decision box 1008), processing logic notifies the recipient about the payment in the sender-selected currency and presents to the recipient an equivalent value in the recipient's primary currency for the payment amount in the sender-selected currency (processing block 1010).

If the recipient denies the payment (decision box 1012), processing logic presents to the sender a message offering the sender to select a different currency.

If the recipient accepts the payment, processing logic funds the payment using one or more payment instruments of the sender (processing block 1013). In one embodiment, if the sender has an account balance in the sender-selected currency, processing logic funds the payment using this account balance. If the sender does not have such account balance, processing logic funds the payment using the sender primary account balance. If the primary account balance does not cover the payment, processing logic may use a sender credit card, a sender bank account, or other account balances within the sender account to fund the payment.

Further, if the recipient accepts the payment, processing logic assesses a receiving fee in the sender-selected currency (processing block 1014) and determines whether the recipient holds an account balance in the sender-selected currency (decision box 1015). If so, processing logic adds the payment to this balance (processing block 1016). If not, processing logic determines whether the recipient requested conversion of the accepted payment into the recipient primary currency (decision box 1018). If so, processing logic performs the conversion (processing block 1020), shows transaction history for the conversion (processing block 1022), and transfers the payment amount to the primary balance.

If the recipient did not request conversion, processing logic creates a new currency balance (processing block 1024), transfers the payment amount to the new currency balance (processing block 1026), and presents a list of existing currency balances with the total amount value to the recipient (processing block 1028).

In one embodiment, if processing logic receives a request to return the payment to the sender, processing logic performs the return in the currency in which the payment was originated using an original exchange rate.

Functions of the online payment service 120 pertaining to multicurrency payments will now be described within the context of user interfaces, according to one embodiment of the present invention. Exemplary representations of the various interfaces are shown in FIGS. 11-20. While the exemplary interfaces are described as comprising markup language documents displayed by a browser, it will be appreciated that the described interfaces could comprise user interfaces presented by any Windows® client application or stand-alone application, and need not necessarily comprise markup language documents.

Figures 11, 12:
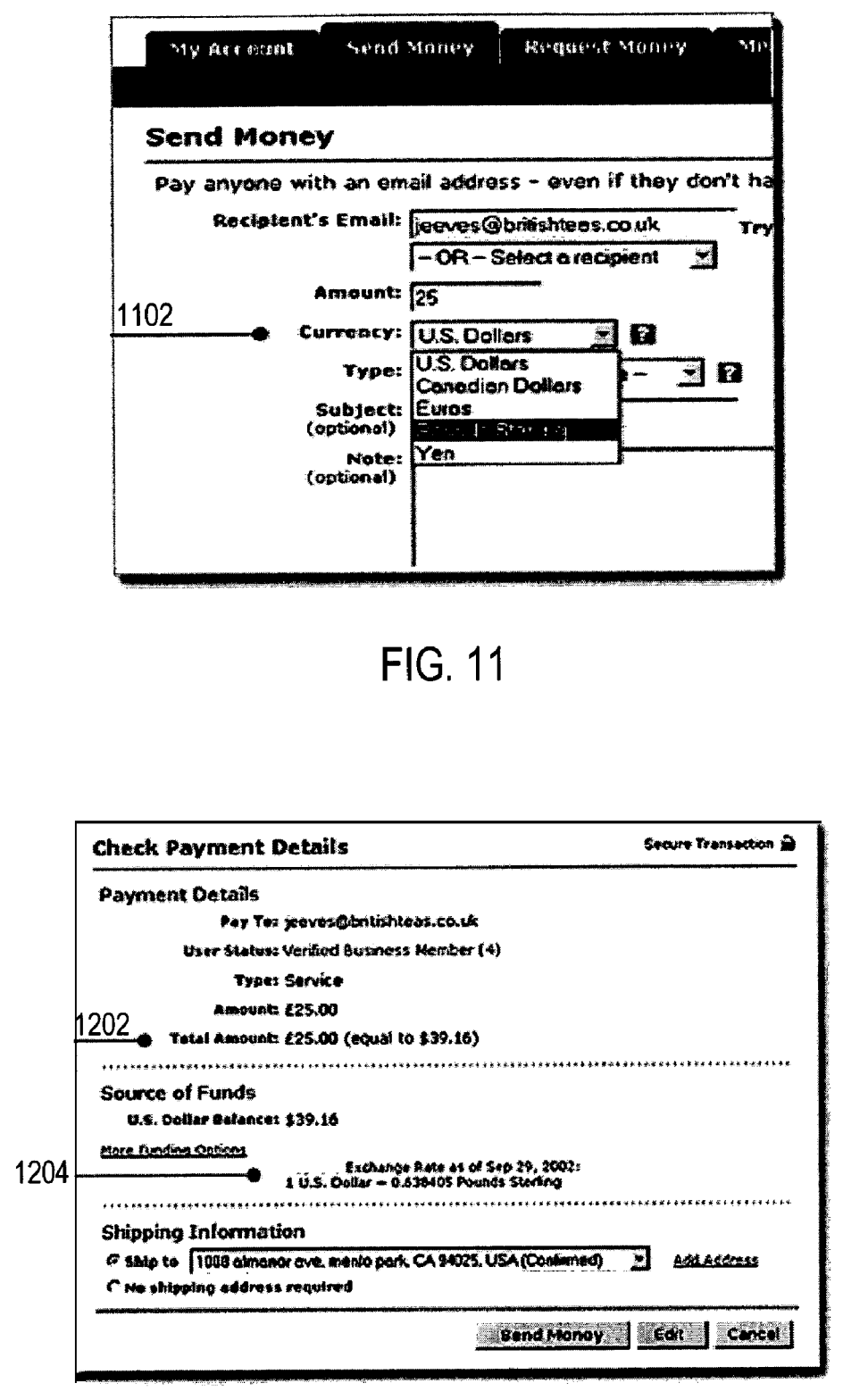

FIG. 11 illustrates an exemplary send money interface that enables a sender to specify which currency 1102 is to be used for a payment.

FIG. 12 illustrates an exemplary check payment details interface that displays a current exchange rate 1204 for conversion between the sender-selected currency and a sender primary currency and an equivalent value 1202 in the sender primary currency. The user interface also includes a send money button 1206 requesting the sender to confirm the payment.

Figure 13:
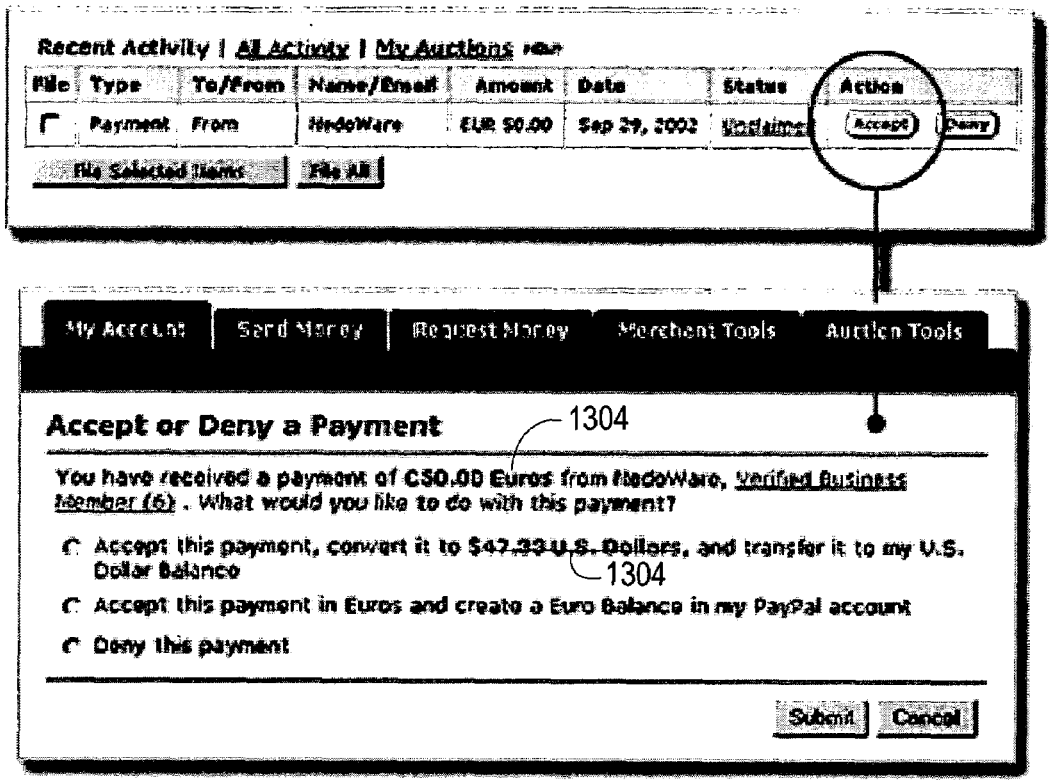

FIG. 13 is an exemplary receive money interface that notifies a recipient about the sender's payment and requests him to specify his decision with respect to the payment. The receive money interface presents to the recipient the payment amount 1304 in the sender-selected currency and an equivalent value 1302 in the recipient primary currency.

Figure 14:
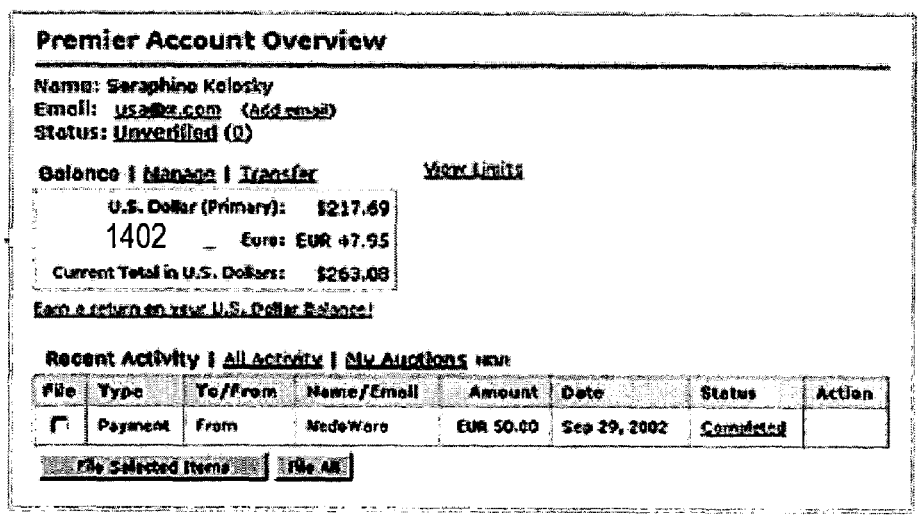

FIG. 14 is an exemplary account overview interface which is presented if the recipient chose to accept the payment in the sender-selected currency. A new balance 1402 created in response to the recipient's acceptance is shown in the Balance box. The balance 1402 reflects an assessment of a receiving fee.

Figures 15, 16:
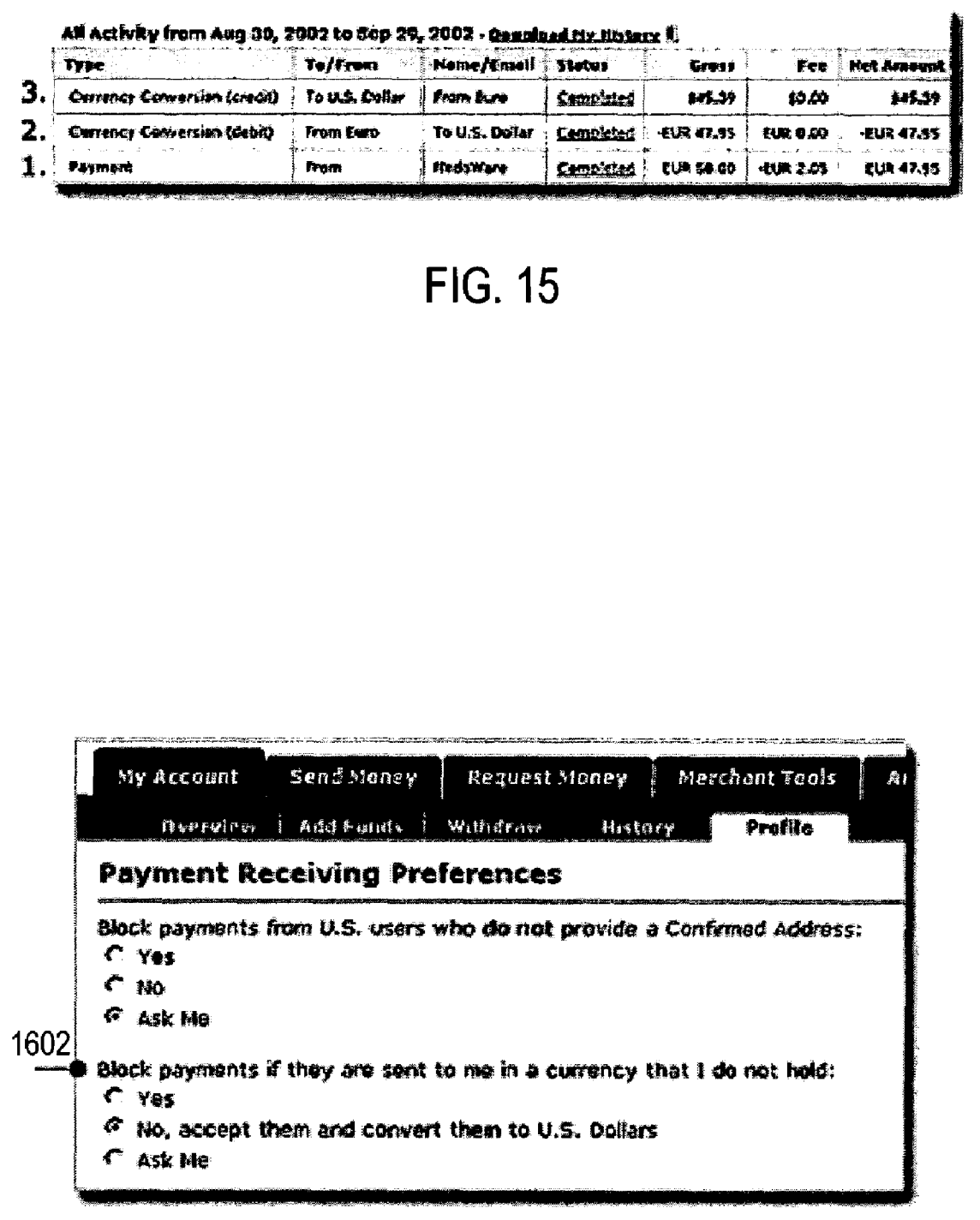

FIG. 15 is an exemplary transaction history interface that is presented in response to the recipient's request to accept the payment in the sender-selected currency and to convert it into the recipient primary currency. The transaction history includes 3 records: (1) the payment received in its original currency, (2) the conversion from the original currency, and (3) the conversion to the recipient's primary currency.

FIG. 16 is an exemplary payment receiving preferences interface that includes information 1602 specifying how the recipient wishes to handle payments that are sent in currencies that the recipient does not hold. As shown, the recipient can request that such payments be blocked, accepted and converted into a primary currency, or be asked about.

Figure 17:
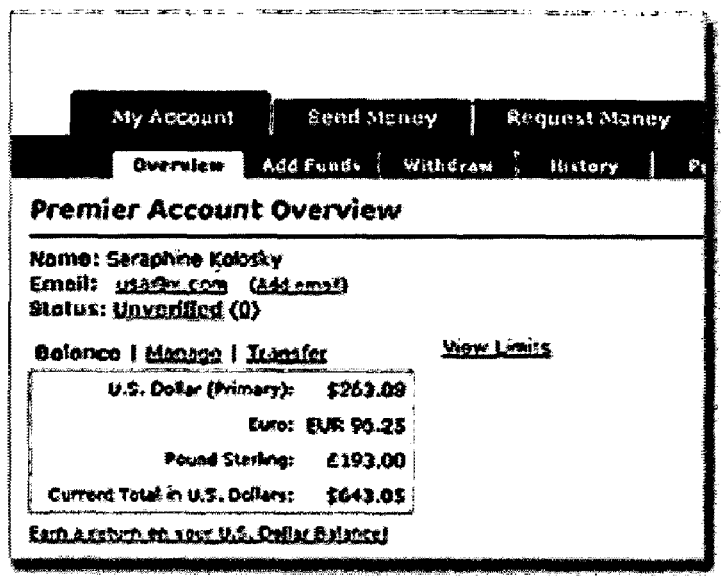

FIG. 17 is an exemplary account overview interface that identifies various currency balances within a user account and provides a total amount of all the balances in the primary currency.

Figure 18:
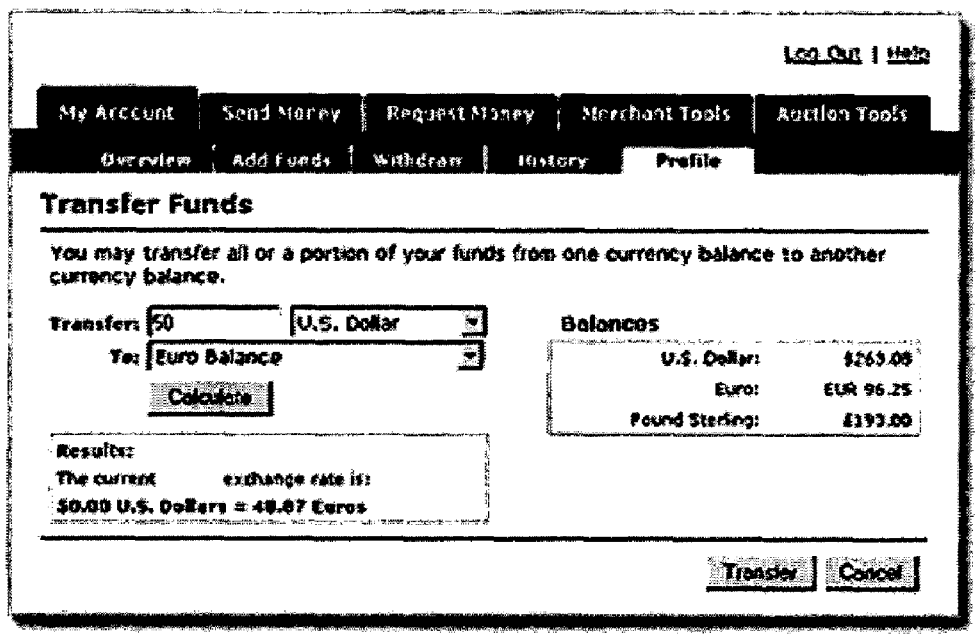

FIG. 18 is an exemplary transfer funds interface that allows a user to transfer funds from one account balance to another. The transfer funds interface also presents a current exchange rate for the conversion, a resulting amount in the desired conversion, and a transfer button to confirm the transfer.

Figures 19, 20:
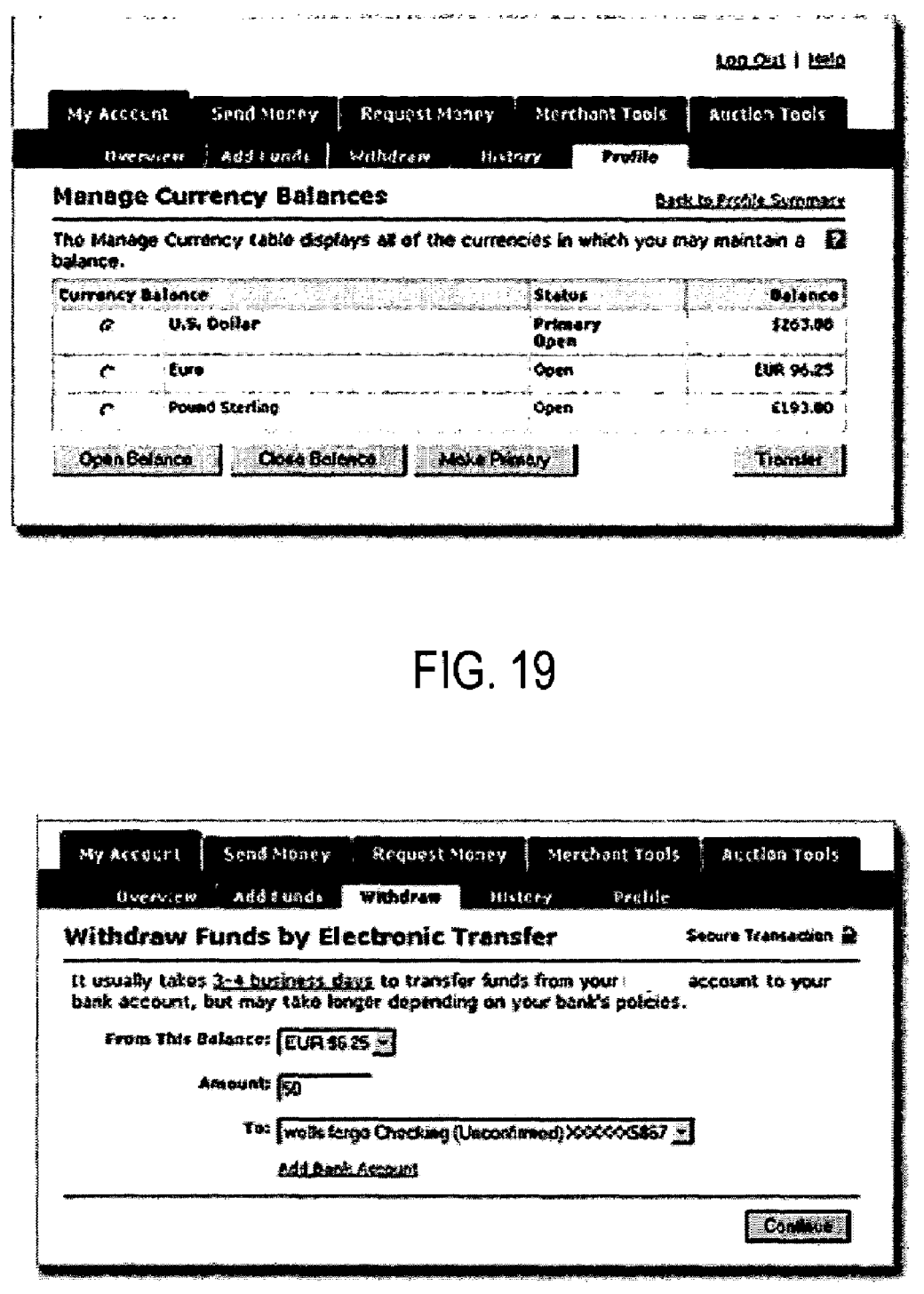

FIG. 19 is an exemplary manage currency interface that displays all the currency in which the user may maintain a balance, allows the user to open a new balance, remove an existing balance and make a certain balance primary.

FIG. 20 is an exemplary withdraw funds interface that allows a user to withdraw funds from any of his currency balances. Before completing the deposit, the funds are converted into the currency of the user bank account and the results are displayed to the user In summary, it will be appreciated that the above described interfaces, and underlying technologies, provide a convenient vehicle for facilitating multicurrency payment transactions in a transaction facility.

Figure 21:
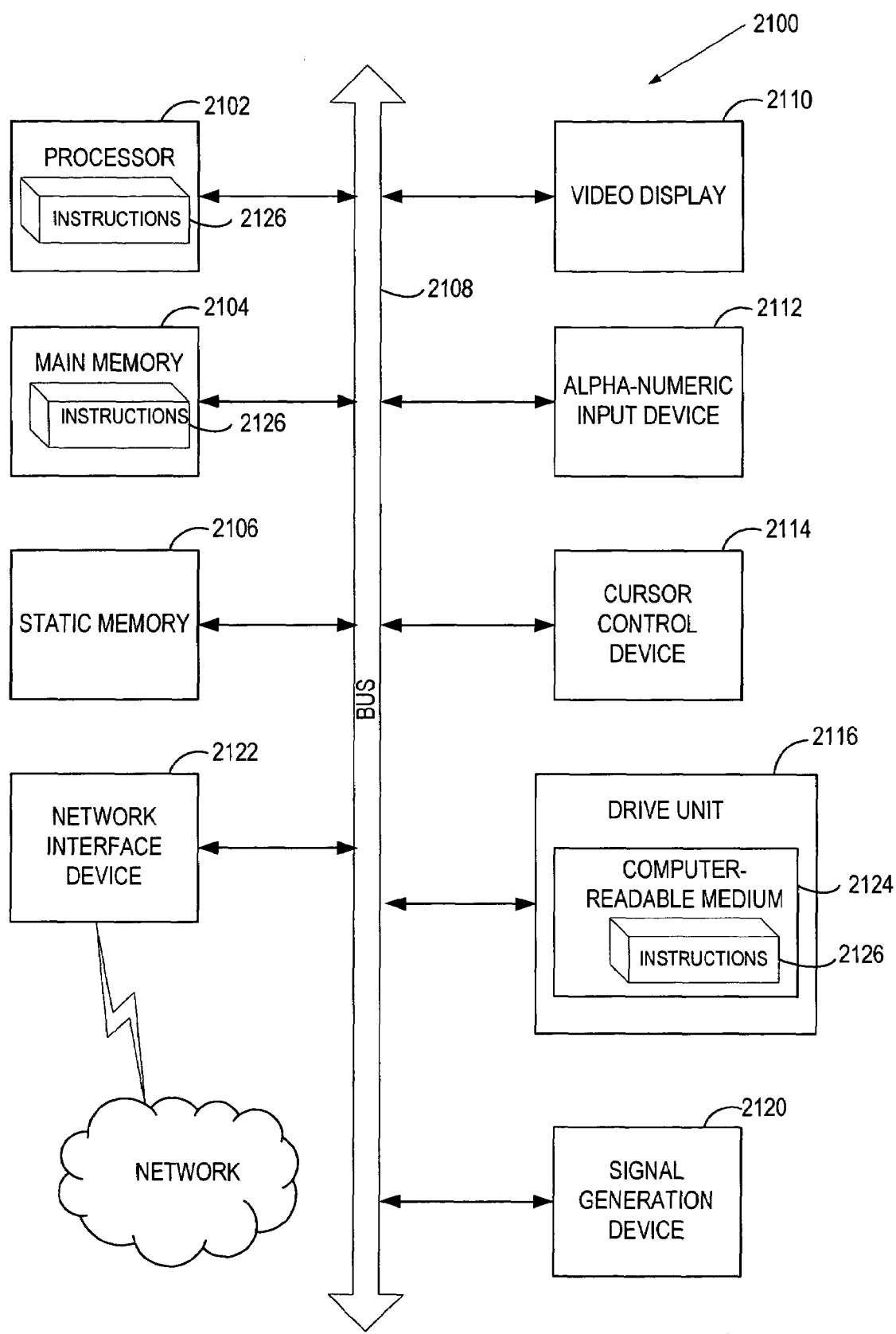
FIG. 21 is a block diagram of one embodiment of a computer system.

FIG. 21 shows a diagrammatic representation of machine in the exemplary form of a computer system 2100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2100 includes a processor 2102, a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alpha-numeric input device 2112 (e.g., a keyboard), a cursor control device 2114 (e.g., a mouse), a disk drive unit 2116, a signal generation device 2120 (e.g., a speaker) and a network interface device 2122.

The disk drive unit 2116 includes a computer-readable medium 2124 on which is stored a set of instructions (i.e., software) 2126 embodying any one, or all, of the methodologies described above. The software 2126 is also shown to reside, completely or at least partially, within the main memory 2104 and/or within the processor 2102. The software 2126 may further be transmitted or received via the network interface device 2122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for facilitating online payment transactions in a network-based transaction facility using multiple payment instruments have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for facilitating online multi-currency payment transactions between participants of a network-based transaction facility, the method comprising:
communicating to a sender via a communications network a user interface that facilitates sender input with respect to a desired currency in which a payment is to be made;
receiving data identifying a sender-selected currency from the sender via the communications network;
communicating to the sender via the communications network information identifying a current exchange rate for conversion between the sender-selected currency and a sender primary currency; and
if receiving a confirmation of the payment in the sender-selected currency from the sender, informing a recipient via the communications network about the payment in the sender-selected currency, the informing the recipient via the communications network including communicating a user interface to the recipient, the user interface to enable a receiving of a selection from the recipient, the selection from the recipient is selected from a group consisting of an acceptance of the payment in the sender-selected currency and a denial of the payment in the sender-selected currency.

2. The method of claim 1 wherein the sender primary currency is a currency used in a majority of transactions involving the sender.

3. The method of claim 1 wherein the payment is to be funded from a balance in the sender-selected currency that is maintained within a sender account.

4. The method of claim 1 further comprising:
determining that the sender does not have a balance in the sender selected currency within the sender account; and
converting an equivalent value in the sender primary currency into the sender-selected currency to fund the payment.

5. The method of claim 4 further comprising displaying the equivalent value in the sender primary currency to the sender prior to converting.

6. The method of claim 1 further comprising updating the current exchange rate at predefined time intervals.

7. The method of claim 6 wherein updating the current exchange rate comprises:
upon determining that a predefined time interval has expired, retrieving current exchange rates from a third party system;
applying a set of rules to the retrieved rates to verify that the retrieved rates are correct; and
replacing existing rates stored in a database with the retrieved rates.

8. The method of claim 7 wherein the retrieved rates are guaranteed by a third party during the predefined time interval.

9. The method of claim 7 further comprising:
accumulating payment transactions in each of a plurality of currencies used during the predefined time interval;
requesting the third party system to trade the accumulated payment transactions; and
receiving confirmation from the third party system that trades of the accumulated payment transactions have been completed.

10. The method of claim 1 further comprising:
    determining that the recipient did not accept the payment in the sender-selected currency; and
    displaying an error message to the sender, the error message offering the sender to select a different currency for the payment.

11. The method of claim 1 further comprising:
    receiving a request to return the payment to the sender; and
    returning funds to a sender account in the sender-selected currency.

12. The method of claim 1 further comprising:
    in response to a sender request, displaying a history of currency conversion calculations from previous transactions involving the sender.

13. The method of claim 1, wherein the user interface further includes a selection from the recipient to accept the payment in the sender-selected currency and convert the payment from the sender selected currency to a recipient primary currency.

14. The method of claim 1, wherein the user interface includes a payment amount in the sender-selected currency and an equivalent amount in the recipient primary currency.

15. A method for facilitating online multi-currency payment transactions between participants of a network-based transaction facility, the method comprising:
    communicating to a recipient via a communications network information identifying a payment in a sender-selected currency and conversion data pertaining to a payment amount in the sender-selected currency;
    receiving from the recipient via the communications network data indicating a recipient decision with respect to an acceptance of the payment in the sender-selected currency; and
    notifying the sender via the communications network of the recipient decision.

16. The method of claim 15 wherein the conversion data pertaining to a payment amount in the sender-selected currency comprises an equivalent value in a recipient primary currency for a payment amount in the sender-selected currency, the recipient primary currency being a currency used in a majority of transactions involving the recipient.

17. The method of claim 15 wherein the sender-selected currency is a currency for which the recipient does not have a balance within a recipient account.

18. The method of claim 17 further comprising:
    determining that the recipient denies the payment in the sender-selected currency; and
    asking the sender to select a different currency for the payment.

19. The method of claim 17 further comprising:
    determining that the recipient accepts the payment in the sender-selected currency;
    determining whether the recipient requests a conversion of the payment amount into the recipient primary currency;
    if the recipient requests the conversion, performing the conversion and adding the payment amount to a balance in the recipient primary currency within the recipient account; and
    if the recipient does not request the conversion, creating a new balance in the sender-selected currency within the recipient account and adding the payment amount to the new balance.

20. The method of claim 19 wherein receiving data indicating a recipient decision with respect to an acceptance of the payment in the sender-selected currency comprises:
    communicating to the recipient via the communications network a payment receiving preference user interface that facilitates recipient input with respect to future payments in currencies for which the recipient does not have a balance within a recipient account;
    receiving from the recipient via the communications network the recipient input with respect to future payments; and
    utilizing the recipient input to determine a recipient preference with respect to an acceptance of the current payment in the sender-selected currency.

21. The method of claim 20 wherein the recipient input is any one of a request to automatically block payments in currencies for which the recipient does not have a balance, a request to automatically accept and convert, into the recipient primary currency, payments in currencies for which the recipient does not have a balance, and a request to let the recipient to make a decision every time a payment is received in a currency for which the recipient does not have a balance.

22. The method of claim 19 further comprising assessing a receiving fee in the sender-selected currency.

23. The method of claim 15 wherein the conversion data pertaining to the payment amount in the sender-selected currency is based on a current exchange rate that is updated at predefined time intervals.

24. The method of claim 23 wherein the updated exchange rate is guaranteed by a third party during a predefined time interval.

25. The method of claim 15 further comprising:
    in response to a recipient request, displaying a history of currency conversion calculations from previous transactions involving the recipient.

26. An apparatus comprising:
    a transaction information receiver to communicate to a sender via a communications network a user interface that facilitates sender input with respect to a desired currency in which a payment is to be made, and to receive data identifying a sender-selected currency from the sender via the communications network;
    a sender funds analyzer to communicate to the sender via the communications network information identifying a current exchange rate for conversion between the sender-selected currency and a sender primary currency; and
    a recipient communicator to communicate a user interface to the recipient to inform the recipient via the communications network about the payment in the sender-selected currency if receiving a confirmation of the payment in the sender-selected currency from the sender, the user interface to enable a receipt of a selection from the recipient, the selection from the recipient is selected from a group consisting of an acceptance of the payment in the sender-selected currency and a denial of the payment in the sender-selected currency.

27. The apparatus of claim 26 wherein the sender primary currency is a currency used in a majority of transactions involving the sender.

28. The apparatus of claim 26 wherein the payment is to be funded from a balance in the sender-selected currency that is maintained within a sender account.

29. The apparatus of claim 26 wherein the sender funds analyzer is to determine that the sender does not have a balance in the sender selected currency within the sender account, and to convert an equivalent value in the sender primary currency into the sender-selected currency to fund the payment.

30. The apparatus of claim 26 further comprising a rate controller to update the current exchange rate at predefined time intervals.

31. The apparatus of claim 30 wherein the updated rate is guaranteed by a third party during a predefined time interval.

32. The apparatus of claim 26 wherein the recipient communicator is to determine that the recipient did not accept the payment in the sender-selected currency, and to display an error message to the sender, the error message offering the sender to select a different currency for the payment.

33. An apparatus comprising:
- a transaction information receiver to communicate to a recipient via a communications network information identifying a payment in a sender-selected currency and conversion data pertaining to a payment amount in the sender-selected currency;
- a recipient decision determinator to receive from the recipient via the communications network data indicating a recipient decision with respect to an acceptance of the payment in the sender-selected currency; and
- a sender notifier to notify the sender via the communications network of the recipient decision.

34. The apparatus of claim 33 wherein the conversion data pertaining to a payment amount in the sender-selected currency comprises an equivalent value in a recipient primary currency for a payment amount in the sender-selected currency, the recipient primary currency being a currency used in a majority of transactions involving the recipient.

35. The apparatus of claim 33 wherein the sender-selected currency is a currency for which the recipient does not have a balance within a recipient account.

36. A system for facilitating online multicurrency payment transactions between participants in a network-based transaction facility, the system comprising:
- the network-based transaction facility to implement a transaction system that facilitates business transactions between a sender and a recipient;
- a client, coupled to the network-based transaction facility, to present user interface information that facilitates sender input with respect to a desired currency in which a payment is to be made; and
- an online payment service, coupled to the network-based transaction facility and the client via the communications network, to receive data identifying a sender-selected currency, to send information identifying a current exchange rate for conversion between the sender-selected currency and a sender primary currency to the client, and to communicate a user interface to the recipient to inform the recipient via the communications network about the payment in the sender-selected currency if receiving a confirmation of the payment in the sender-selected currency from the sender, the user interface to enable a receipt of a selection from the recipient, the selection from the recipient is selected from a group consisting of an acceptance of the payment in the sender-selected currency and a denial of payment in the sender-selected currency.

37. A system for facilitating online multicurrency payment transactions between participants in a network-based transaction facility, the system comprising:
- the network-based transaction facility to implement a transaction system that facilitates business transactions between a sender and a recipient;
- a client, coupled to the network-based transaction facility, to present information identifying a payment in a sender-selected currency and conversion data pertaining to a payment amount in the sender-selected currency; and
- an online payment service, coupled to the network-based transaction facility and the client via the communications network, to receive from the client data indicating a recipient decision with respect to an acceptance of the payment in the sender-selected currency, and to notify the sender via the communications network of the recipient decision.

38. A computer readable medium comprising instructions, which when executed on a processor, cause the processor to perform a method comprising:
- communicating to a sender via a communications network a user interface that facilitates sender input with respect to a desired currency in which a payment is to be made;
- receiving data identifying a sender-selected currency from the sender via the communications network;
- communicating to the sender via the communications network information identifying a current exchange rate for conversion between the sender-selected currency and a sender primary currency; and
- informing a recipient via the communications network about the payment in the sender-selected currency if receiving a confirmation of the payment in the sender-selected currency from the sender, the informing the recipient via the communications network including communicating a user interface to the recipient, the user interface enabling a receiving of a selection from the recipient, the selection from the recipient is selected from a group consisting of an acceptance of the payment in the sender-selected currency and a denial of payment in the sender-selected currency.

39. A computer readable medium comprising instructions, which when executed on a processor, cause the processor to perform a method comprising:
- communicating to a recipient via a communications network information identifying a payment in a sender-selected currency and conversion data pertaining to a payment amount in the sender-selected currency;
- receiving from the recipient via the communications network data indicating a recipient decision with respect to an acceptance of the payment in the sender-selected currency; and
- notifying the sender via the communications network of the recipient decision.

* * * * *

UNITED STATES PATENT AND TRADEMARK OFFICE
CERTIFICATE OF CORRECTION

PATENT NO. : 7,742,985 B1  Page 1 of 1
APPLICATION NO. : 10/608525
DATED : June 22, 2010
INVENTOR(S) : Giacomo Digrigoli et al.

It is certified that error appears in the above-identified patent and that said Letters Patent is hereby corrected as shown below:

On page 2, in column 1, under "U.S. Patent Documents", line 8, delete "Arunachalum" and insert -- Arunachalam --, therefor.

In column 4, line 32, after "also" insert -- includes a request money sub-module that allows users to request money in any currency using a request money user interface with a list of currencies for user selection. In one embodiment, the multicurrency transfer module 200 also --.

In column 5, line 38, delete "band" and insert -- bank --, therefor.

In column 11, line 24, after "user" insert -- . --.

Signed and Sealed this

Seventeenth Day of August, 2010

David J. Kappos
*Director of the United States Patent and Trademark Office*